United States Patent
Greenfield et al.

(10) Patent No.: US 6,544,294 B1
(45) Date of Patent: Apr. 8, 2003

(54) METHOD AND APPARATUS FOR CREATING, EDITING, AND DISPLAYING WORKS CONTAINING PRESENTATION METRIC COMPONENTS UTILIZING TEMPORAL RELATIONSHIPS AND STRUCTURAL TRACKS

(75) Inventors: Stephen Greenfield, Glendale, CA (US); Michael McNally, Glendale, CA (US); Chris Huntley, Glendale, CA (US)

(73) Assignee: Write Brothers, Inc., Glendale, CA (US)

( * ) Notice: Subject to any disclaimer, the term of this patent is extended or adjusted under 35 U.S.C. 154(b) by 0 days.

(21) Appl. No.: 09/323,166

(22) Filed: May 27, 1999

(51) Int. Cl.[7] .......................... G06F 15/00; G06F 17/21; G06F 17/00
(52) U.S. Cl. .................... 715/526; 715/500.1; 715/101; 717/1
(58) Field of Search .............................. 707/526, 101, 707/104.1, 500.1; 717/1; 345/340, 473, 348, 328, 302; 463/1; 386/52

(56) References Cited

U.S. PATENT DOCUMENTS

| | | | | |
|---|---|---|---|---|
| 5,760,767 A | * | 6/1998 | Shore et al. | 345/328 |
| 5,781,188 A | * | 7/1998 | Amiot et al. | 345/328 |
| 5,781,687 A | * | 7/1998 | Parks | 386/52 |
| 5,782,692 A | * | 7/1998 | Stelovsky | 463/1 |
| 5,826,102 A | * | 10/1998 | Escobar et al. | 345/302 |
| 5,852,435 A | * | 12/1998 | Vigneaux et al. | 707/500.1 |
| 5,859,641 A | * | 1/1999 | Cave | 345/348 |

(List continued on next page.)

OTHER PUBLICATIONS

Macromind Mediamaker Users Guide, 1990 Macromind, Inc., pp. 86–89, 92–98, 137–139.*

(List continued on next page.)

Primary Examiner—Stephen S. Hong
Assistant Examiner—William L. Bashore
(74) Attorney, Agent, or Firm—J. D. Harriman, II, Esq.; Coudert Brothers LLP

(57) ABSTRACT

The invention comprises a computer-based system for creating, editing, and displaying works such as, for example, books, screenplays, speeches, or multimedia works, that include textual components that have a presentation metric associated with them. In one or more embodiments of the invention, the presentation metric is the time that passes when the component is delivered to the intended audience. In one or more embodiments, the components of a work are referred to as "events." The invention creates graphical representations of events that visually display the presentation metric of the events and the temporal relationships between events. Events may be subsets of other events. In one or more embodiments, a hierarchy of events is displayed upon parallel levels, each of which represents a different level in the hierarchy. In this embodiment, changes to the presentation metrics of events at one level in the hierarchy are appropriately reflected in the presentation metrics of events in other levels of the hierarchy. One or more embodiments of the invention allow associations between events and certain user selected characteristics, features, resources, concepts or other items or things (collectively referred to as "structures") to be displayed. In one or more embodiments, "structural tracks" are displayed, each of which represents one or more of such structures. These structural tracks are displayed parallel to the event presentation metric lines. Links identify events that have a relationship to the structure represented by the structural track.

18 Claims, 14 Drawing Sheets

U.S. PATENT DOCUMENTS

| | | | | |
|---|---|---|---|---|
| 5,889,514 A | * | 3/1999 | Boezeman et al. | 345/340 |
| 5,889,519 A | * | 3/1999 | Boezeman et al. | 345/340 |
| 5,907,704 A | * | 5/1999 | Gudmundson et al. | 717/1 |
| 5,930,797 A | * | 7/1999 | Hill | 707/101 |
| 5,999,173 A | * | 12/1999 | Ubillos | 345/328 |
| 6,011,562 A | * | 1/2000 | Gagne et al. | 345/473 |
| 6,031,529 A | * | 2/2000 | Migos et al. | 345/340 |
| 6,072,479 A | * | 6/2000 | Ogawa | 707/104.1 |

OTHER PUBLICATIONS

Hamakawa, Rei et al., Object composition and playback models for handling multimedia data, ACM Proceedings of the conference on Mulitmedia '93, pp. 273–281, Aug. 1993.*

Ackermann, P., Direct manipulation of temporal structres in a multimedia application, Proceedings of the second ACM international conference on Mulitmedia '94, pp. 51–58, Oct. 1994.*

* cited by examiner

Assume that the following diagram shows two Timelines, shown at the same time scale, using a strictly linear ruler.

Timeline A: Linear-time

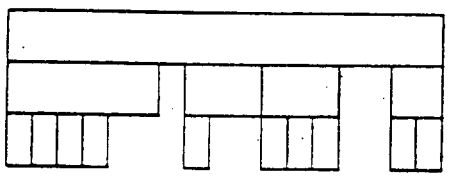

Timeline B: Linear-time

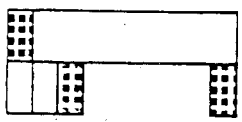

Assume that the next diagram shows the same two Timelines, now displayed with their layouts determined strictly by bottom-up layout requirements, completely ignoring time. In this example, Timelines A and B have rather different display requirements. For example, Timeline A might contain events that are purely textual and just need a small amount of screen space to display their Event Connection Boxes and the first few characters of their titles, while Timeline B might contain large images that require a certain amount of space to display without being truncated.

Figure 13

Timeline A: Non-linear layout requirements

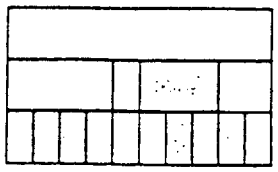

Timeline B: Non-linear layout requirements

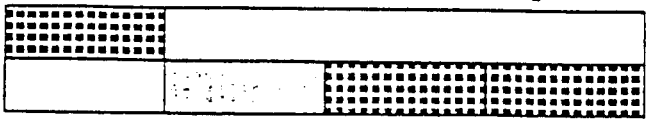

If these two Timelines were to be displayed in parallel, using a nonlinear ruler, something like the following might result:

Timelines A and B in parallel

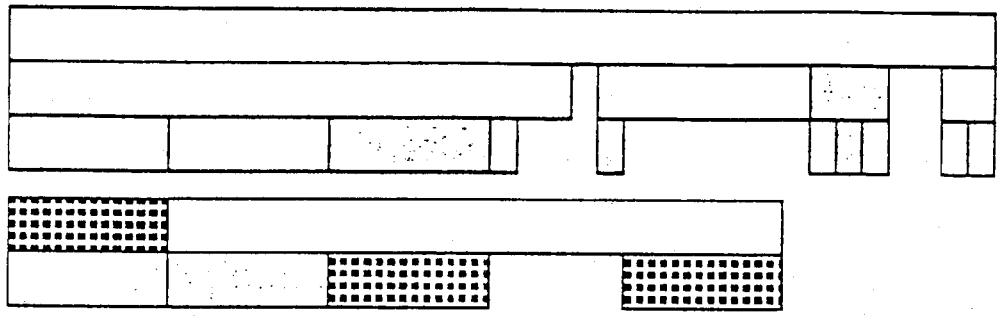

The above display faithfully maintains the order relationships of the two Timelines, while selectively stretching portions of Timeline A in order to meet the minimum-display requirements of Timeline B.

Figure 14

METHOD AND APPARATUS FOR CREATING, EDITING, AND DISPLAYING WORKS CONTAINING PRESENTATION METRIC COMPONENTS UTILIZING TEMPORAL RELATIONSHIPS AND STRUCTURAL TRACKS

BACKGROUND OF THE INVENTION

1. Field of the Invention

The present invention relates to a method and apparatus for creating, editing, printing, and displaying works of authorship, including screenplays, books, speeches, multimedia works and other works, that contain components that have an associated presentation metric.

2. Background Art

Outlining tools exist to help in the creation and organization of works such as books, reports, articles, memoranda, letters, etc. that consist primarily of textual content. Outlining tools allow an author to organize his or her thoughts into a logical outline structure that forms the basis for the work that is being created. The outline typically consists of a list of various levels of headings and subheadings that identify the major and minor content pieces of the work and the sequence in which they are to be arranged. An outline is similar in appearance and structure to a table of contents. It provides an overview of the topic areas and sequential structure of the work. A common process for creating a work is to create an outline of the headings and subheadings for the work as a whole and then to generate the content for each heading and subheading.

Certain types of primarily textual (or other) works may have a presentation dimension associated with them referred to here as a "presentation metric". Examples of presentation metrics include elapsed time, reading time, elapsed pages, proportion of story completed, chapter position, and others. An example of a primarily textual work that has a time based presentation metric associated with it is a screenplay. A typical screenplay for a commercial feature film is approximately 120 pages in length, with each page representing approximately one minute of screen time. The presentation metric for each page of a screenplay is therefore approximately one minute. A screenplay is often divided into acts, scenes, and actions and dialogues within a scene. The presentation metric for each of these components may be defined as the screen time allocated to these components when filmed. Another example of a work containing time-dimensioned textual components is a written speech. The presentation metric for a written speech may be defined as the time it takes for the speech to be verbally delivered. The presentation metric for a page of a written speech depends on the speaking and delivery style and tempo of the person delivering the speech.

In creating a work that includes textual content that has an associated presentation metric, it would be useful to be able to visualize the work from a presentation-time point of view. That is, it would be useful to be able to see how the various parts of the work will appear in time when they are presented in the intended manner. This is particularly useful for a work such as a screenplay for a typical commercial feature film, in which certain types of actions, events and/or transitions are expected to occur at certain time-points within the presentation metric of the film. It would also be useful to be able to edit and manipulate the time representation of such works to allow an author to change the temporal relationship of parts of the work while maintaining the integrity and consistency of the work as a whole.

SUMMARY OF THE INVENTION

The invention comprises a computer-based system for creating, editing, printing, and displaying works such as, for example, books, screenplays, speeches, or multimedia works, that include textual components that have a time dimension associated with them. In one or more embodiments of the invention, the time dimension is the time that passes when the component is delivered to the intended audience. This kind of time dimension is referred to as a presentation metric. For example, if the work is a novel, a component may be a chapter and the associated presentation metric may be defined as an average or expected time for a reader to read the chapter. In another example, if the work is a screenplay, a component may be a scene and the associated presentation metric may be defined as the duration of the scene in the film that is made from the screenplay, also referred to as the "screen time." In one or more embodiments, the components of a work are referred to as "events." The invention creates graphical representations of events that visually display the presentation metric of the events and the temporal relationships between events. Events may be subsets of other events. In one or more embodiments, the events are represented as bars arranged and registered along a time line. In one or more embodiments, the length of each bar represents the presentation metric of the event represented by the bar. In one or more embodiments, the bars also display and allow the editing of the textual content of the event. In one or more embodiments, the time lines of the invention may be oriented horizontally, vertically, or at any other desired orientation.

In one or more embodiments, the work is a screenplay in text form, the events include acts, scenes, actions and dialogues, and the presentation metric of each event is the screen time of the event. In one or more embodiments, the work is a book, the events are chapters, and the presentation metric is an average time it takes for a reader to read the chapter. Note that events could be pages, paragraphs, sentences or any other suitable division and need not have a direct translation to actual time. In these embodiments, the invention provides a user who is creating a book or screenplay with a visual, editable overview of the relationships of the individual events to each other and to the presentation metric for the work as a whole.

In one or more embodiments, events may be arranged in one or more hierarchies of events. In this embodiment, changes to the time dimensions of events at one level in a hierarchy are appropriately reflected in the time dimensions of events in other levels of the hierarchy.

One or more embodiments of the invention allow associations between events and certain user selected characteristics, features, resources, concepts or other items or things (collectively referred to as "structures") to be displayed. In one or more embodiments, "structural tracks" are displayed, each of which re presents one or more of such structures. These structural tracks are displayed parallel to the event time line. Links identify events that have a relationship to the structure represented by the structural track. For example, a structure may represent a particular character, and links may indicate events in which the character appears. Other examples of structures include a musical theme that accompanies certain events, clues that are presented in an event (if the work is a mystery, for example), physical items featured in an event, a geographical location of an event, whether an event is a flashback or occurs in the present time, the use of special effects, and anything else that the author of a work may wish to associate with the events of the work. Structures may include, for example, any and all of the "appreciations" described in U.S. Pat. No. 5,734, 916, assigned to assignee of the present invention and incorporated by reference herein.

Any number of structural tracks may be displayed. In one or more embodiments, the events linked to a particular structure can be identified by enabling a highlighting function of the relevant structural track. By doing so, events that have an association with that structure are highlighted or displayed, while the remaining events may be dimmed or not displayed.

BRIEF DESCRIPTION OF THE DRAWINGS

FIG. 13 is a block diagram of the application of Rule 4 in accordance with one embodiment of the present invention.

FIG. 14 is a block diagram of the application of Rule 4 in accordance with one embodiment of the present invention.

DETAILED DESCRIPTION OF THE INVENTION

A method and apparatus for creating, editing, manipulating and displaying works containing components having associated presentation metrics is described. In the following description, numerous specific details are set forth to provide a more thorough description of the invention. It will be apparent, however, to one skilled in the art, that the invention may be practiced without these specific details. In other instances, well-known features have not been described in detail so as not to obscure the invention.

Figure 1:
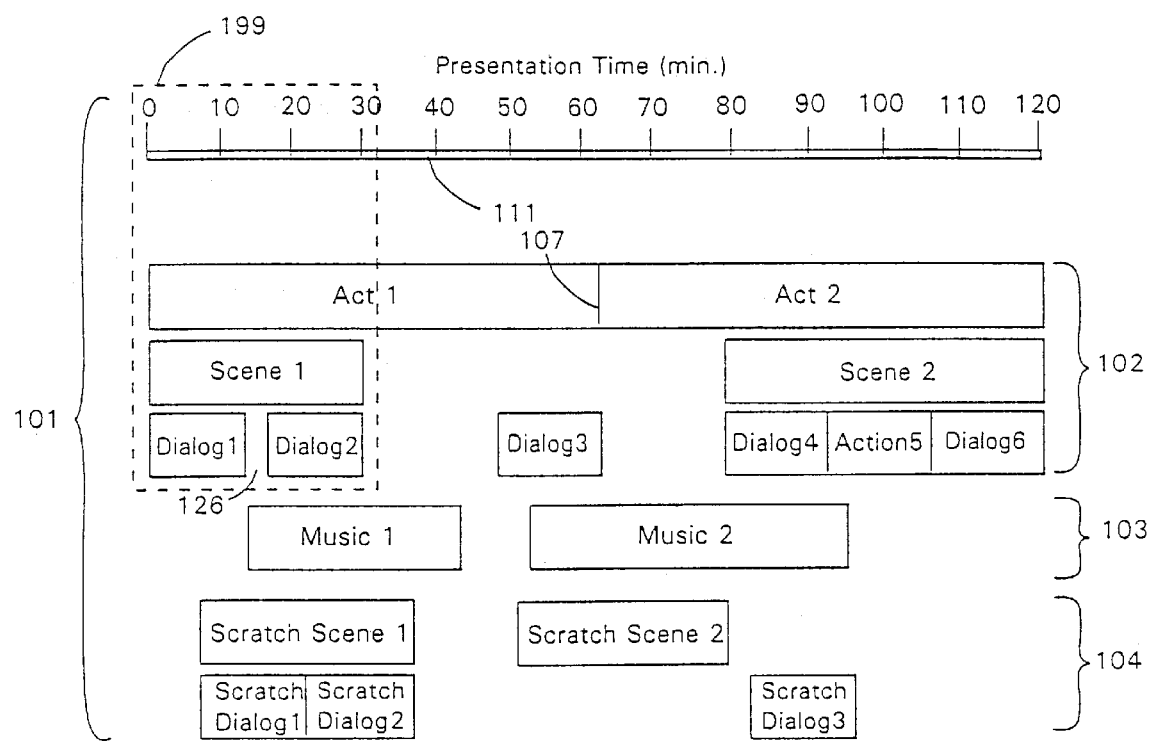
FIG. 1 shows a time line representing a work such as screenplay according to one or more embodiments of the invention.

FIG. 1 illustrates a time line 101 according to one or more embodiments of the invention. The time line of FIG. 1 is oriented in a horizontal direction. However, the time line of the invention may be oriented horizontally, vertically, or in any other direction.

Time line 101 represents a screenplay that is in the process of being created. Time line 101 displays several types of events that form part of the screenplay, including acts, scenes, dialogues/actions, music, scratch scenes, and scratch dialogues. The overall horizontal dimension of time line 101 represents the presentation metric of the film for which the screenplay is being written. Each event is represented by a bar whose horizontal dimension represents the presentation metric (screen time) of the event.

The events of the embodiment of FIG. 1 have been grouped by the user into three hierarchies. The first hierarchy, indicated by reference number 102, is a hierarchy of acts, scenes, and dialogues/actions. (Please note that events of different types may be defined to reside on the same level in a hierarchy. Thus, the user can create the types "dialog" and "action" and alternate between them at will. In one embodiment, by selecting an option referred to as "staggering", events of differing types at a selected level may be made to "stagger", or spread apart. The effect of this is that all of the action items get pulled out into their own levels, leaving dialog items in their own level. One expected usage is that users may wish to create events connected to specific storylines or themes, and the staggering allows them to see the pieces of these separate themes in a simultaneous manner.) The second hierarchy, indicated by reference number 103 is a hierarchy of music events. In the example of FIG. 1, hierarchy 103 contains a single event level. The third hierarchy, indicated by reference number 104, is a hierarchy of scratch scenes and scratch dialogues. These hierarchies are discussed in greater detail below.

Screenplays are often divided into acts, which in turn are divided into scenes, which in turn are divided into dialog and action. Hierarchy 102 of FIG. 1 corresponds to this act-scene-dialogue/action structure.

The top level of act-scene-dialogue/action hierarchy 102 of FIG. 1 contains two events: Act 1 and Act 2. In FIG. 1, the combined horizontal dimensions of Act 1 and Act 2 span the entire horizontal dimension of time line 101. Accordingly, the presentation metrics of Act 1 and Act 2 equal the presentation metric of the screenplay as a whole. Or, viewed another way, Act 1 and Act 2 make up the entire screenplay. (Note that feature screenplays typically have three acts, but two are used here for example purposes).

The second level of the act-scene-dialogue/action hierarchy 102 of FIG. 1 contains two events: Scene 1 and Scene 2. (Note that although screenplays typically have 30–100 scenes, only two are used here for example purposes.) Scene 1 is shown positioned below Act 1 such that the left end of Scene 1 is positioned vertically directly below the left end of Act 1. The right end of Scene 1 is situated vertically below approximately the mid-point of Act 1. In terms of presentation metric, therefore, Scene 1 starts at the beginning of Act 1 and continues approximately halfway through Act 1. Scene 2 is positioned below Act 2 such that the left end of Scene 2 is positioned approximately one-third of the way along Act 2, while the right end of Scene 2 is positioned directly vertically below the right end of Act 2. In terms of presentation metric, therefore, Scene 2 begins about one-third of the way through Act 2 and continues to the end of Act 2.

The gap between Scene 1 and Scene 2 indicates that there are portions of Act 1 and Act 2 that are not included in Scene 1 and Scene 2. This may be, for example, because the screenplay represented by FIG. 1 is still a work in progress, and additional scenes will be added, or additional material may be added to Scene 1 and Scene 2 to extend their respective presentation metrics.

The third level of the act-scene-dialogue/action hierarchy 102 of FIG. 1 contains six events:. Dialogue 1, Dialogue 2, Dialogue 3, Dialogue 4, Action 5 and Dialogue 6.

Dialogue 1 and Dialogue 2 are positioned vertically below Scene 1, indicating that Dialogue 1 and Dialogue 2 are parts of Scene 1. Dialogue 1 is positioned such that the left end of Dialogue 1 coincides with the left end of Scene 1 while the right end of Dialogue 1 is located to the left of the mid-point of Scene 1. The placement of Dialogue 1 thus indicates that Dialogue 1 starts at the beginning of Scene 1 and ends a little less than half-way through Scene 1. Dialogue 2 is positioned such that the left end of Dialogue 2 is located to the right of the mid-point of Scene 1 while the left end of Dialogue 2 coincides with the left end of Scene 1. The placement of Dialogue 2 thus indicates that Dialogue 2 starts a little further than half-way through Scene 1 and continues to the end of Scene 1.

In the example of FIG. 1, there is a gap 126 between Dialogue 1 and Dialogue 2. This gap indicates that there is a portion of Scene 1 (the portion above gap 126) that exists between Dialogue 1 and Dialogue 2. This gap may indicate, for example, that a portion of Scene 1 remains to be written or that something other than dialog takes place during this time. The gap may be closed, for example, by adding material to Dialogue 1 and/or Dialogue 2, or by creating a new event to fill the gap.

Dialogue 4, Action 5, and Dialogue 6 are positioned vertically below Scene 2. The left edge of Dialogue 4 coincides with the left edge of Scene 2, the right edge of Dialogue 6 coincides with the right edge of Scene 2, and there are no gaps between any of Dialogue 4, Action 5, and Dialogue 6. Accordingly, Dialogue 4, Action 5, and Dialogue 6 make up the entirety of Scene 2.

Dialogue 3 is positioned below the gap between Scene 1 and Scene 2. Dialogue 3 is therefore not at this point part of any scene. Dialogue 3 is positioned such that its right edge corresponds with the right edge of Act 1. Dialogue 3 is therefore the last dialogue in Act 1.

The second hierarchy 103 of the time line of FIG. 1 is a hierarchy of music events. These music events may, for example, represent music or musical themes or textual descriptions of music that will form part of the film's soundtrack. In the example of FIG. 1, the music event hierarchy 103 has a single level that contains Music event 1 and Music event 2. As shown in FIG. 1, Music event 1 occurs during the middle part of Act 1. Music event 2 begins near the end of Act 1 and continues about two-thirds of the way through Act 2.

The third hierarchy 104 of FIG. 1 is a "scratch" hierarchy of "scratch scenes" and "scratch dialogues.". In this example, scratch scenes and scratch dialogues are scenes and dialogues that are not yet part of act-scene-dialogue/ action hierarchy 102. Scratch scenes and dialogues may, for example, be scenes and dialogues that are still being created and whose placement in act-scene-dialogue/action hierarchy 102 has not yet been determined by the user.

The top level of the scratch hierarchy 104 of FIG. 1 contains Scratch Scene 1 and Scratch Scene 2. The second level contains Scratch Dialogue 1, Scratch Dialogue 2, and Scratch Dialogue 3. Scratch Scene 1 has tentatively been located ("parked") by the author below Act 1, while Scratch Dialogue 1 and Scratch Dialogue 2 are positioned directly below Scratch Scene 1. Scratch Dialogue 1 and Scratch Dialogue 2 therefore comprise all of the dialogue in Scratch Scene 1. Scratch Scene 2 does not as yet contain any dialogues. It has been placed by the author below the junction between Act 1 and Act 2. Scratch Dialogue 3 is not as yet part of any scratch scene, and has been placed by the author below Dialogue 4.

Time line 101 gives the author a graphical view of the progress and structure of the screenplay being written, indicating temporal relationships between events, and showing gaps between events that remain to be filled. The events shown on time line 101 may be manipulated and rearranged, for example, by a cursor control device such as a mouse, track ball, or other cursor control or pointing device.

According to the invention, the graphical representations of events registered on the time line of the invention may be graphically manipulated in a number of ways based on user input. For example, events may be resized, moved, deleted and created. User input may take a variety of forms, including keyboard commands, pointing and clicking with a pointing device such as a mouse, pull down menus, voice input, etc. As explained in greater detail below, when an editing operation is performed on an event on the time line, the invention ensures that the integrity and consistency of any hierarchy to which the event belongs, and of any related hierarchies and the time line as a whole, is maintained. Editing operations that do not maintain such integrity and consistency are ordinarily not allowed.

Figure 2:
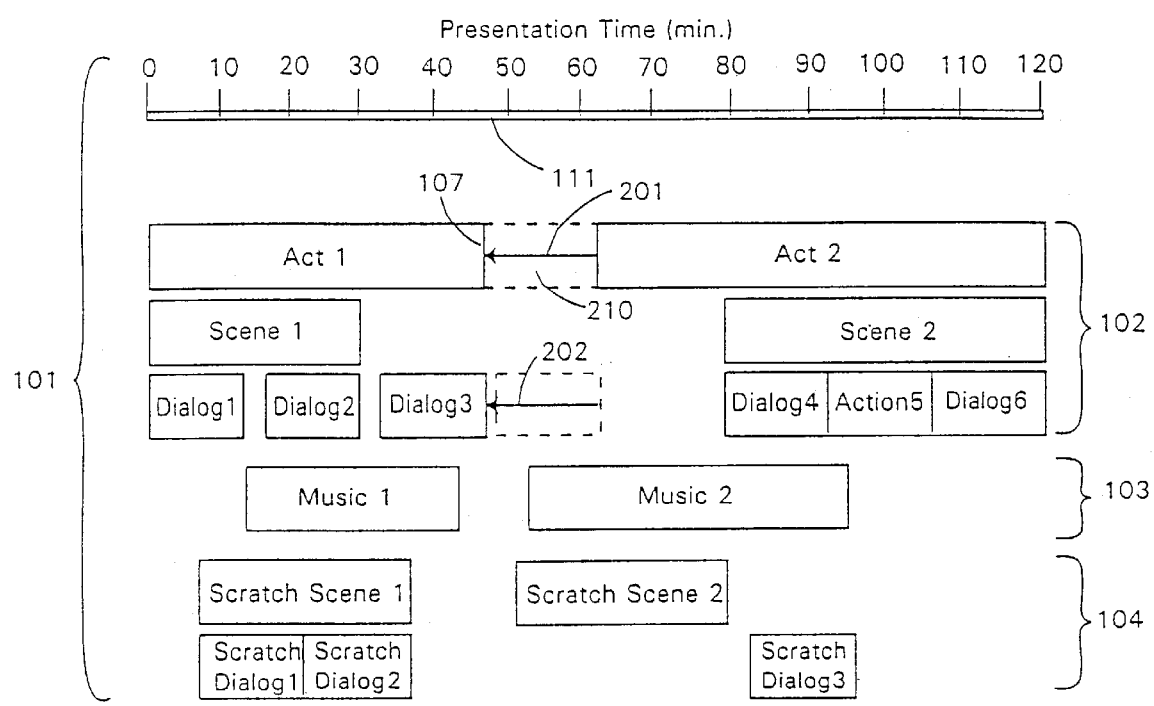
FIG. 2 shows the time line of FIG. 1 after an editing operation has been performed according to one or more embodiments of the invention.

FIG. 2 shows the time line of FIG. 1 after a resizing operation has been performed according to one or more embodiments of the invention. In FIG. 2, Act 1 has been resized by moving right end 107 of Act 1 to the left, for example by clicking and dragging right end 107 to the left using a pointing device such as a mouse, or by selecting Act 1 and manually entering a new desired time dimension. Arrow 201 in FIG. 2 indicates the distance that light end 107 has been moved. In the example of FIG. 2, right end 107 of Act 1 has been moved a distance to the left that is equivalent to approximately 15 minutes of screentime, thereby reducing the duration of Act 1 by approximately 15 minutes and creating, at least temporarily, a 15 minute gap 210 between Act 1 and Act 2.

Moving right end 107 of Act 1 also causes the position of Dialogue 3 to be changed as indicated by arrow 202. Dialogue 3 is part of Act-Scene-Dialogue/Action hierarchy 102. The resizing of Act 1 might also orphan Dialog 3, shrink Dialog 3, and/or shrink the siblings of Dialog 3. All possible consequences of resizing can be controlled by a user's selections and preferences. In the embodiment of FIGS. 1 and 2, each event that is a subset of an event at a higher level in the hierarchy must fit within the event of which it is a subset. For example, dialogue that is part of an act cannot extend beyond the end of the act. In addition, events that are on the same level of the hierarchy cannot overlap. For example, the end of a scene cannot extend beyond the beginning of the next adjacent scene. According to the invention, if one event in a hierarchy is changed, that change is propagated as necessary to other events in the hierarchy to maintain the structural integrity and consistency of the hierarchy according to the above criteria.

Figure 3:
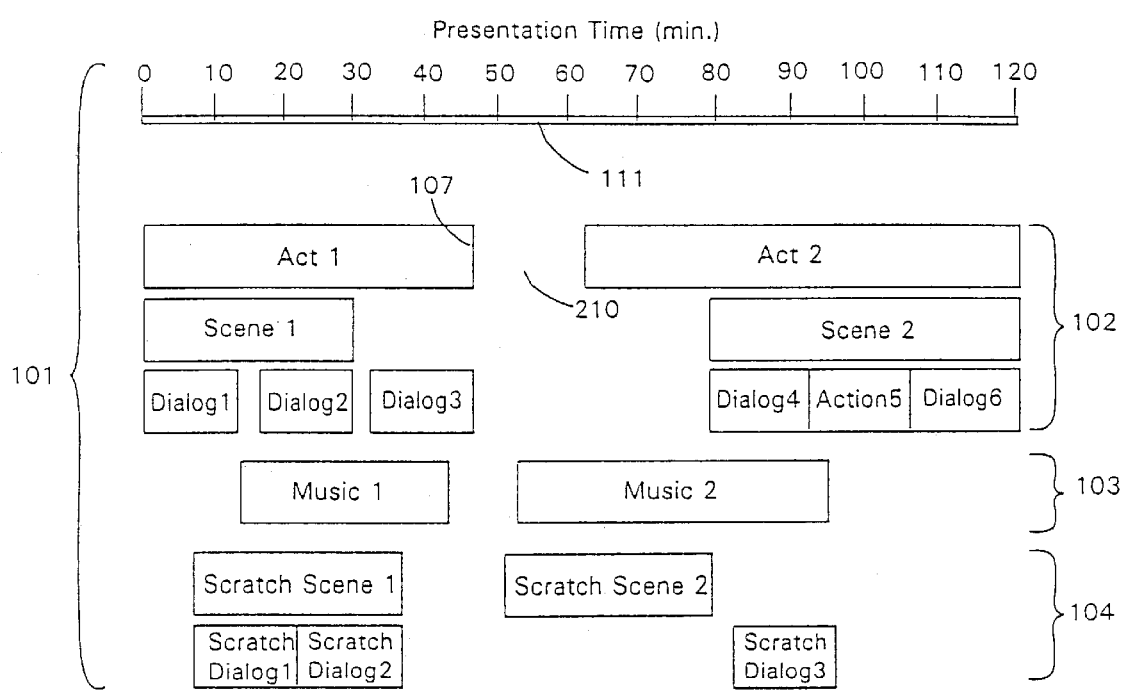
FIG. 3 shows the time line of FIG. 2 after an editing operation has been performed according to one or more embodiments of the invention.

In the state of the time line shown in FIG. 1, Dialogue 3 is registered on time line 101 such that the right end (i.e. the end) of Dialogue 3 coincides with the right end 107 of Act 1. When right end 107 of Act 1 is moved from approximately minute 62 on time scale 111 to minute 47 as indicated by arrow 201, Dialogue 3 must move correspondingly to prevent Dialogue 3 from extending beyond the end of Act 1 and to maintain the registration of the right end of Dialogue 3 with right end 107 of Act 1. FIG. 3 shows the state of time line 101 after the editing operation of FIG. 2 has been completed.

Figure 4:
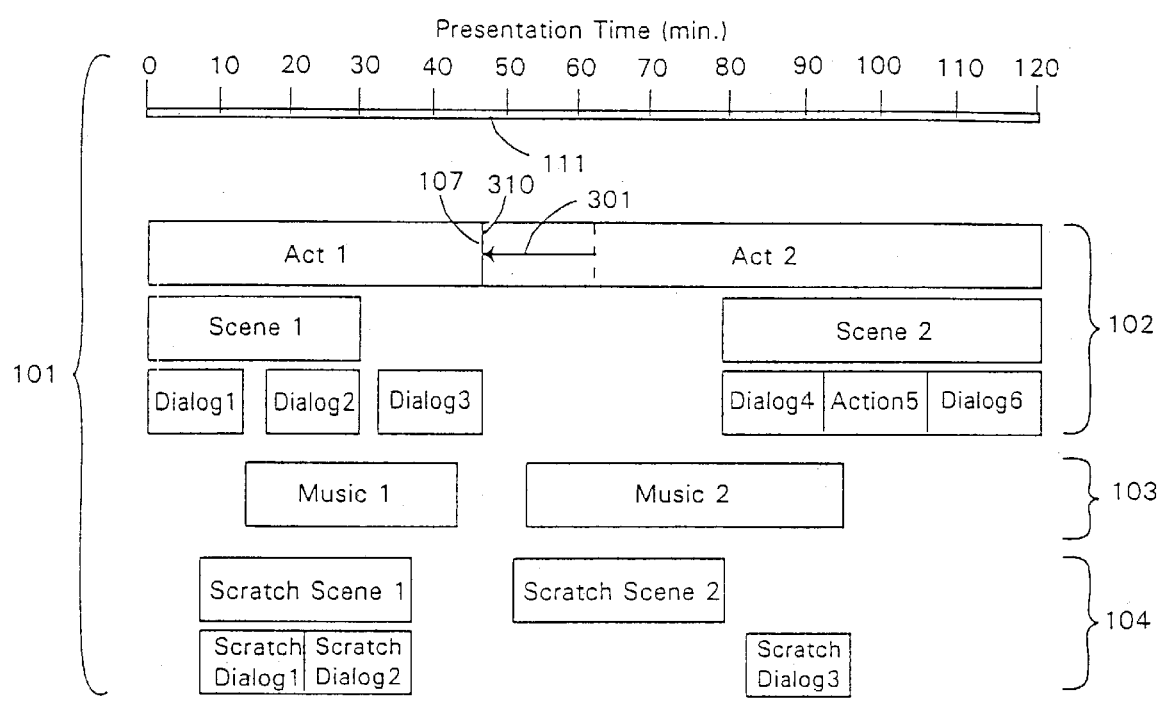
FIG. 4 shows the time line of FIG. 3 after an editing operation has been performed according to one or more embodiments of the invention.

FIG. 4 shows the time line of FIG. 3 as a subsequent editing operation is being performed. In FIG. 4, the length of Act 2 has been increased by moving the left end (i.e. the beginning) 310 of Act 2 from minute 62 of time scale 111 to minute 47 of time scale 111, as indicated by arrow 301. The duration of Act 2 is thereby increased by 15 minutes, and gap 210 formed between Act 1 and Act 2 during the editing operation shown in FIGS. 2 and 3 is thereby filled.

Figure 5:
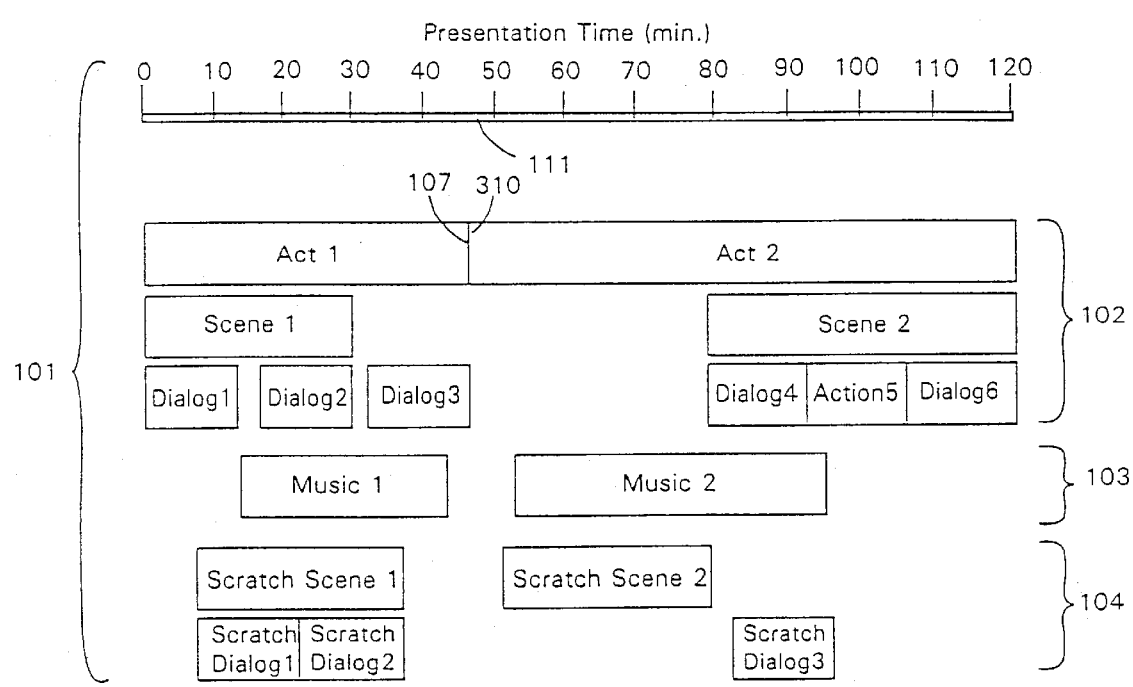
FIG. 5 shows the time line of FIG. 4 after an editing operation has been performed according to one or more embodiments of the invention.

Although Act 2 has "child" events associated with it within Act-Scene-Dialogue/Action hierarchy 102 (namely Scene 2, Dialogue 4, Action 5, and Dialogue 6), no changes are necessary to Act 2's child events as a result of the displacement of left end 310 15 minutes to the left as indicated by arrow 301. This is because Scene 2, Dialogue 4, Action 5, and Dialogue 6 are positioned towards the end of Scene 2 and can remain in place as the location of left end 310 is shifted without affecting the structural integrity and consistency of hierarchy 102. FIG. 5 shows the state of time line 101 after the editing operation of FIG. 4 has been completed.

Figure 6:
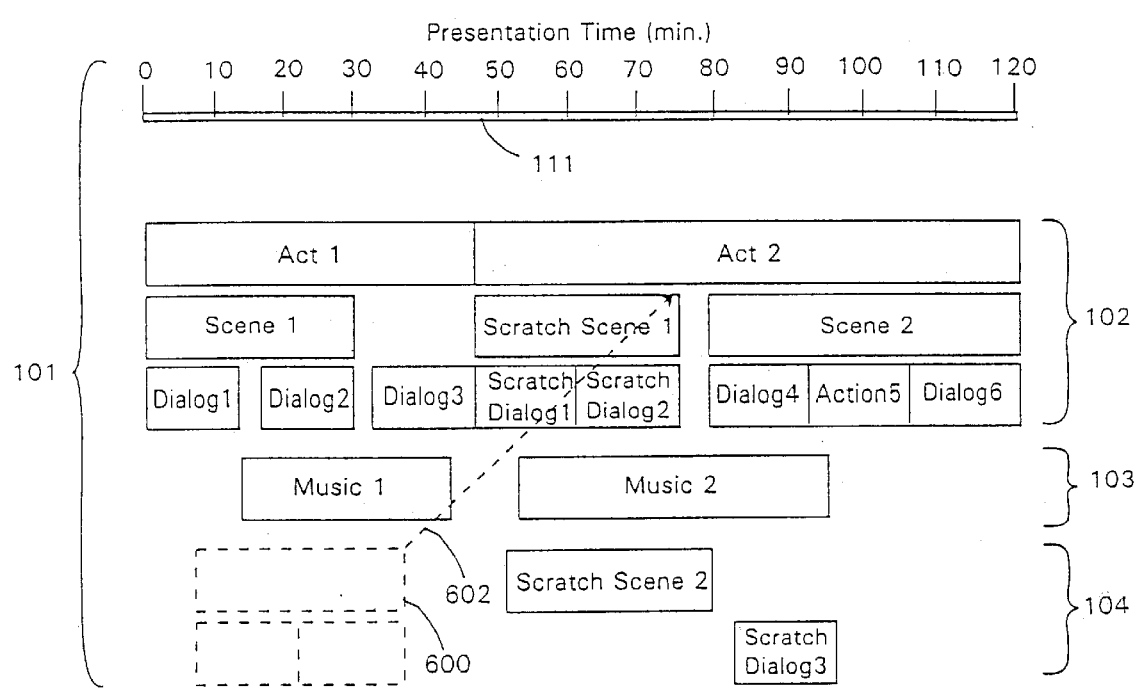
FIG. 6 shows the time line of FIG. 5 after an editing operation has been performed according to one or more embodiments of the invention.

FIG. 6 shows the time line of FIG. 5 as a subsequent editing operation is being performed. In FIG. 6, Scratch Scene 1 has been moved (for example by dragging and dropping using a pointing device such as a mouse, or by selecting, cutting and pasting using pull down menus or keyboard commands) from its original position 600 in Scratch hierarchy 104 to a new position, under Act 2 in Act-Scene-Dialogue/Action hierarchy 102, as indicated by arrow 602. According to the invention, moving an event that is a parent of children events sometimes moves the children events as well. Typically, the user can move selected events as a group, where selection of events can be applied on an individual event basis, or in a hierarchical fashion. Accordingly, as Scratch Scene 1 is moved to its new location under Act 2 in hierarchy 102, its children events, Scratch Dialogue 1 and Scratch Dialogue 2, are relocated as well. In its new location, Scratch Scene 1 is a member of the Scene level of Act-Scene-Dialogue/Action hierarchy 102, while Scratch Dialogue 1 and Scratch Dialogue 2 are members of the Dialogue level of Act-Scene-Dialogue/Action hierarchy 102, as shown in FIG. 6.

In the embodiments of FIGS. 1–6, hierarchies 102, 103 and 104 are displayed adjacent to and separate from each other. Further, within each hierarchy, each level in the hierarchy is immediately adjacent to its parent or child level, and the parent levels are displayed at a higher vertical location than the child levels. However, in one or more embodiments of the invention, each level of each hierarchy can be positioned by the user at any desired height on time line 101, (however, in one embodiment, a child level may not be displayed above a parent level), and levels of different hierarchies may be intertwined. Regardless of the order in which the event levels are displayed, however, the relationship between the events in each hierarchy, and the manner in which changes to an event in one level of a hierarchy are reflected in events at other levels in the hierarchy, remain the same. Interleaving or intertwining the levels of different hierarchies may aid the user in visualizing the relationships between events in different hierarchies.

Figure 7:
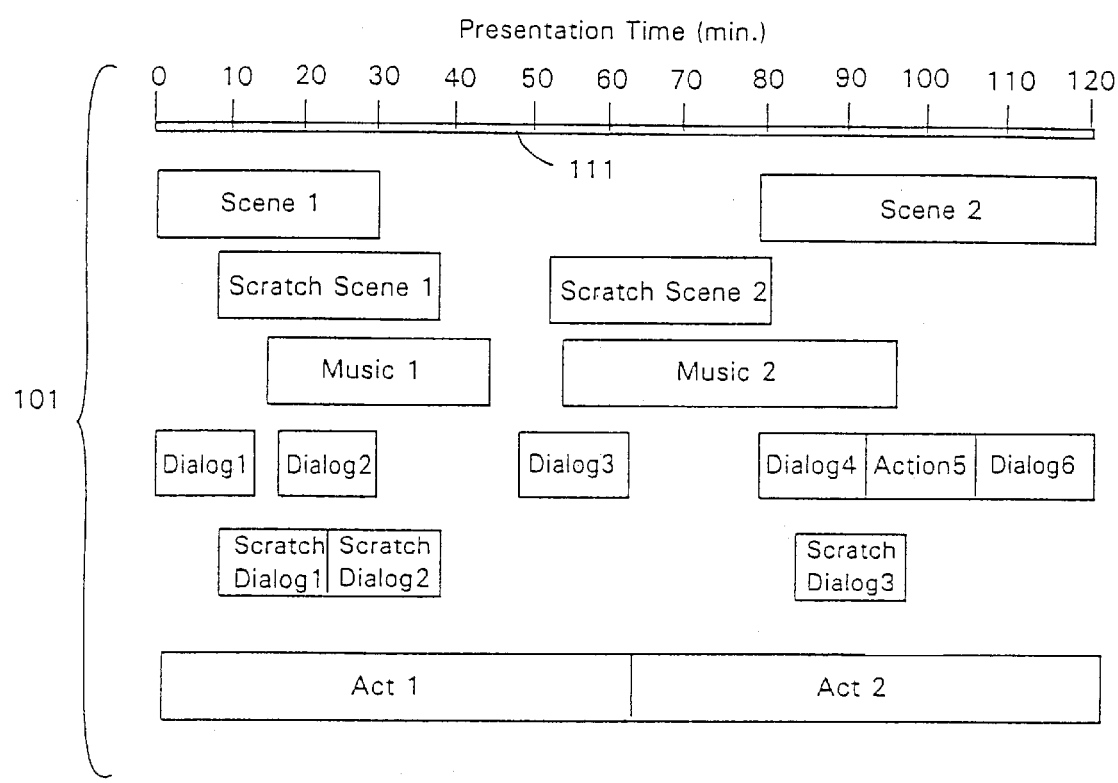
FIG. 7 shows an alternate arrangement of the time line of FIG. 1 according to one or more embodiments of the invention.

FIG. 7 shows an example of how the different event levels of the hierarchies of time line 101 of FIG. 1 may be rearranged. Even though the order of event levels in FIG. 7 is different from that in FIG. 1, the relationship between the event levels within each hierarchy remains the same.

In FIGS. 1 to 7, an event is represented as a simple rectangular bar with label identifying the event, with one dimension of the bar (the width, in the case of FIGS. 1 to 7) being proportional to the presentation metric of the content of the event. In one or more embodiments of the invention, other representations of events may be used, and/or a user may select from among several available representations, for example representations that provide different kinds or amounts of information about the event to the user, or that provide for different kinds of user input or editing capabilities.

In one or more embodiments, the vertical and horizontal scales of the displayed time line can be changed independently or in tandem so as to shrink or expand the current view of the time line displayed to a user. The content (e.g. text) wraps to fit the shape of a view or event so that a user can customize views depending on their own display size, resolution, etc. If an event is displayed such that the entire event (i.e. its beginning and end) are not displayed, then the content is wrapped to fill the area that is visible.

What this means is that if a user has scrolled or magnified the timeline so that the last third of Action 5 is visible, and the entire event Dialog 6 is visible, then the textual content of Action 5 (if that content is displayed) will be wrapped so that the user can begin reading that content from the START of the text—even though the user is only seeing a small portion of the event.

This is different from other timeline magnification schemes, which simply enlarge the events. In prior art, you would simply see an enlarged view of the event, thus seeing a clipped portion of Action 5's text.

The net effect for the user is that as they scroll or scale or magnify the timeline, events which are clipped at the boundaries of the timeline have their content rewrapped so that it remains readable.

Figure 8:
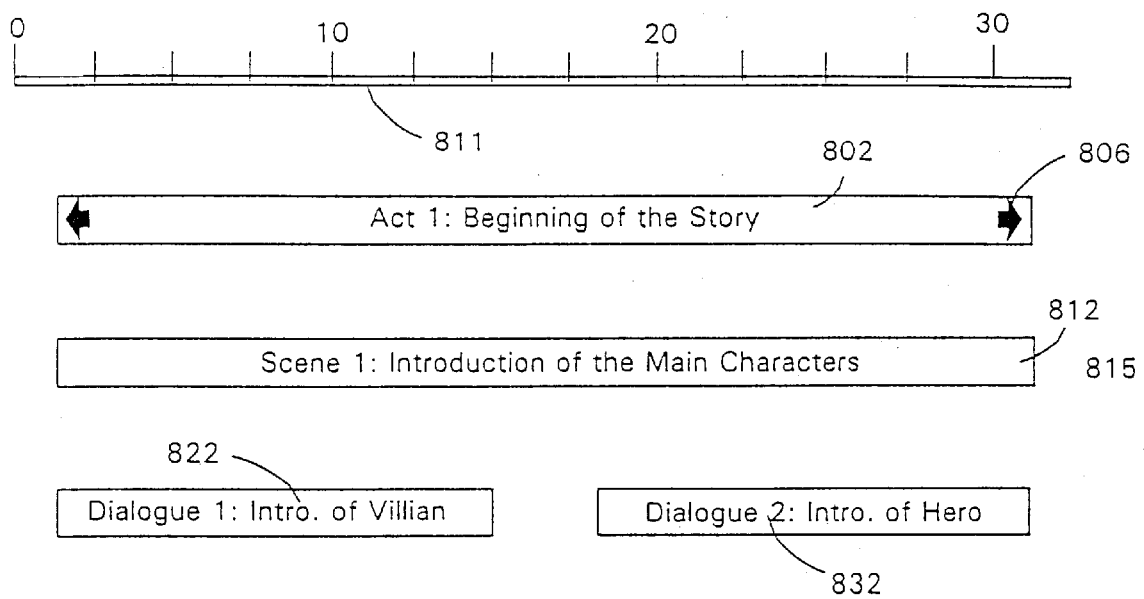
FIG. 8 shows a time line representing a work such as screenplay according to one or more embodiments of the invention.

FIG. 8 shows a magnified or "zoomed in" view of the portion of time line 101 of FIG. 1 indicated by broken line 199 in FIG. 1. In FIG. 8, the time scale has been magnified such that the width of FIG. 8 represents only about the first 30 minutes of the presentation metric of the screenplay represented by the time line. As a result, the events contained in the portion of time line 101 indicated by broken line 199 of FIG. 1 have an expanded horizontal size in FIG. 8.

Four events are shown in FIG. 8: Act 1, Scene 1, Dialogue 1, and Dialogue 2. Act 1 corresponds to Act 1 in FIG. 1, Scene 1 corresponds to Scene 1 in FIG. 1, and Dialogue 1 and Dialogue 2 correspond to Dialogue 1 and Dialogue 2, respectively, in FIG. 1. As in FIG. 1, Scene 1 is a child event of Act 1, and Dialogue 1 and Dialogue 2 are child events of Scene 1.

The representations of the events shown in FIG. 8 are similar to the representations of the corresponding events in FIG. 1. Like the events in FIG. 1, each event in FIG. 8 is represented by a horizontal bar whose width corresponds to the presentation metric of the event. Also, like the representation of the events in FIG. 1, the representations of the events in FIG. 8 include event title areas 802, 812, 822 and 832 that display the respective titles of the events. For example, in the case of Dialogue 2, the title of the event is "Dialogue 2: Intro. of Hero."

If an event is too wide to be displayed at the magnification at which the time line is being displayed, as in the case of Act 1, a continuation arrow such as arrow 806 is displayed to indicate that the actual duration of the event extends beyond the border of the display.

In the embodiment of FIG. 8, activating a "detail switch" (for example by clicking on the switch using a pointing device such as a mouse) toggles between displaying and not displaying a content window for all events in a given level. An event's content window displays the current content of the event to a user, and allows a user to create, edit, and modify the event's content. In FIG. 8, none of the events's content windows are currently displayed. (An example of a detail switch is switch 1077 of FIG. 10).

Figure 9:
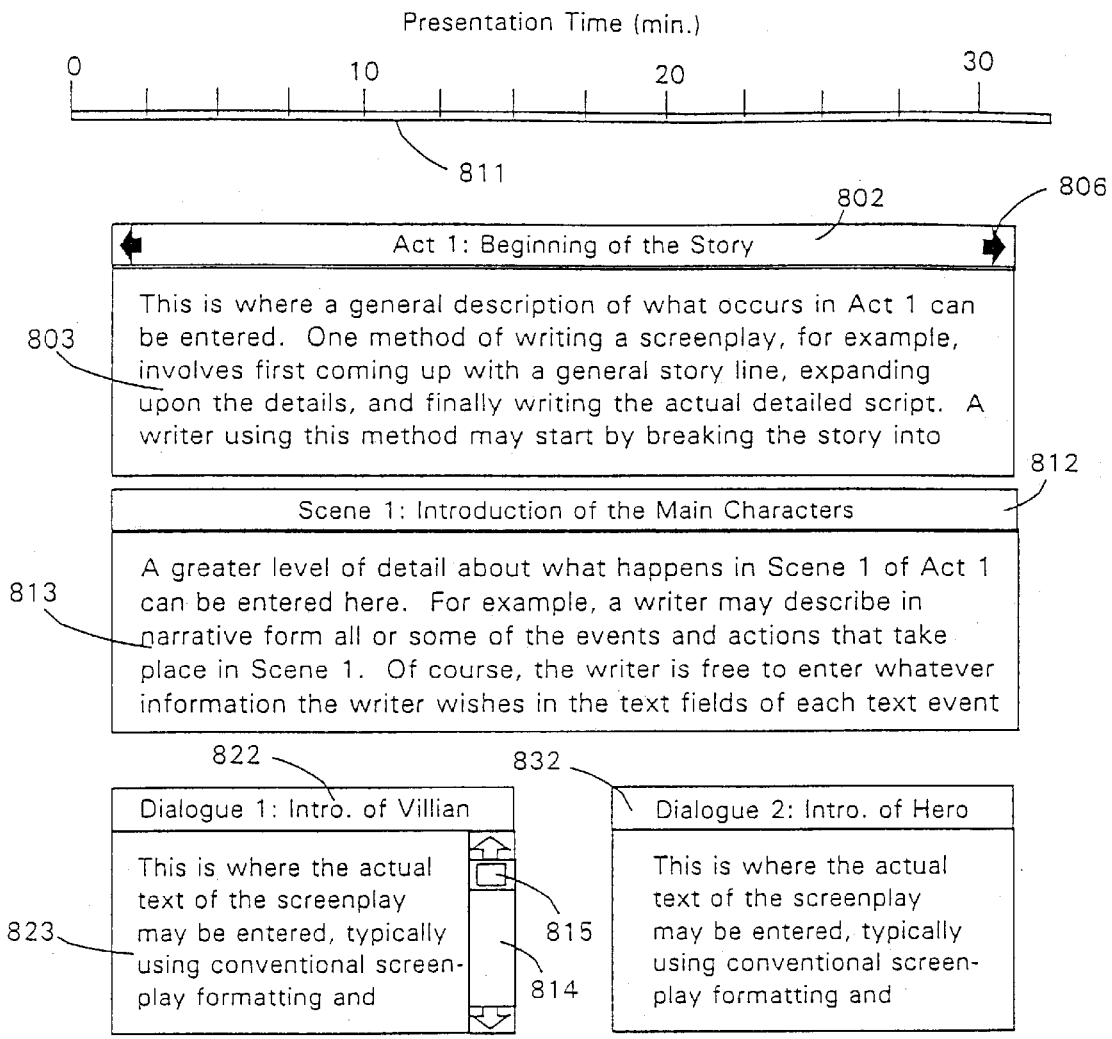
FIG. 9 shows the time line of FIG. 8 after content display windows for certain events of FIG. 8 have been activated.

FIG. 9 shows the time line of FIG. 8 such that content windows 803, 813 and 823 are displayed. In one or more embodiments, when a content display window is displayed, any events that would be obscured by the display of the content window are displaced such that they are not so obscured. Accordingly, Scene 1, Dialogue 1, and Dialogue 2 are shifted down vertically (from their positions in FIG. 8) to make room for content display window 803 for Act 1. The displayed events are automatically shifted back to their original location when detail is toggled off.

In the embodiment of FIG. 9, Act 1, Scene 1, and Dialogue 1 are each textual events. Accordingly, their content comprises text, and it is this textual content that is displayed in their respective content display windows. In one or more embodiments of the invention, the size of a content display window can be varied by the user, for example by specifying a size preference or by dragging the bottom edge or other resizing point of a content display window with a pointing device such as a mouse. In addition, in one or more embodiments of the invention, the scale at which the content of an event is displayed in the event's content display window may be set by the user. If the size of the window is not large enough to display the contents at the desired scale, a scroll bar is activated and displayed that allows the user to scroll the text displayed in the content display window. In the embodiment of FIG. 9, the textual content of each of Act 1, Scene 1 and Dialogue 1 is in each case more than can be displayed at one time in content display windows 803, 813 and 823, respectively. Accordingly, whichever of content display windows 803, 813, and 823 is active is outfitted with a scroll bar to allow scrolling of the textual content displayed in the respective content display windows.

The user is free to enter whatever textual, graphical, video, and/or audio content the user desires into the content display window for an event, and may specify whether the presentation metric of the event is to be dependent upon the amount of text entered into the content display window, or whether the presentation metric for the event is to be determined in some other manner. For example, the user may specify a relationship between the presentation metric of the event and the number of words or lines of text contained in the event's content display window. For example, if the text being entered in an event's content window is the text for a screenplay, the user may choose to have each 55 lines of, for example, 12 point courier text to be equivalent to one minute of presentation metric. In one or more embodiments, the user may select the relationship between the amount of text in an event's content window and the presentation metric of the event from a predetermined selection available, for example, by activating a pull down menu. Alternatively, the user may specify a beginning and/or end time for an event, a set duration for an event, may specify a relationship between the beginning and/or end time and/or duration of an event and the beginning and/or end time and/or duration of one or more other events, or may specify any other desired relationship between the duration of an event and the content of its or another event's content window.

In the embodiment of FIG. 9, for example, the user may have specified that the beginning of Act 1 occur at presentation metric zero and that the duration of Act 1 is 62 minutes. Because the magnification level shown in FIG. 8 only displays approximately the first 30 minutes of presentation metric, arrow 806 indicates that Act 1 continues beyond the right border of the current view.

Figure 10:
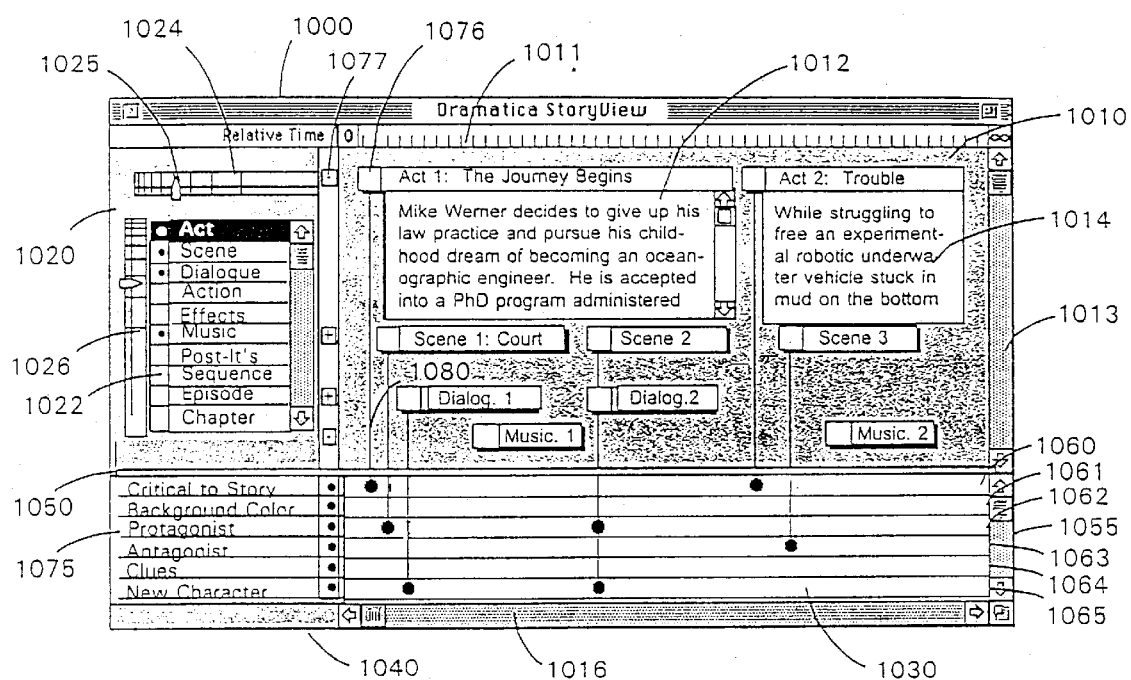
FIG. 10 shows an interface incorporating one or more embodiments of the time line and structural tracks of the invention.

FIG. 10 shows an embodiment of a user interface 1000 of the invention that displays structural tracks that may be linked to the events on a time line. The interface of FIG. 10 is divided vertically into upper and lower portions by dividing line 1050. The upper portion of interface 1000 includes time line display area 1010 and time line control area 1020. The lower portion of interface 1000 includes structural track display area 1030 and structural track control area 1040. The relative sizes of the upper and lower portions can be changed by dragging dividing line 1050 upwards or downwards, for example by using a pointing device such as a mouse.

Time line display area 1010, depending on the size of the time line and the magnification used, displays all or part of a time line of events in a manner similar to the embodiments of FIGS. 1–9. As such, time line display area 1010 contains a number of events that may be arranged in hierarchies. Each hierarchy contains one or more levels of events. The view shown in FIG. 10 contains two hierarchies. The first hierarchy consists of act, scene and dialogue events. This hierarchy includes Act 1, Act 2, Scene 1, Scene 2, Scene 3, Dialogue 1 and Dialogue 2. The second hierarchy is a hierarchy of music events. This hierarchy includes Music 1 and Music 2. As in the embodiments of FIGS. 8 and 9, the content of each event can be displayed by activating a content display window. In the example of FIG. 10, the content display windows 1012 and 1014 for Act 1 and Act 2 have been activated and are displayed.

Time line display area 1010 operates as a movable window that may be moved so as to display different sections of the underlying time line as a whole. In the embodiment of FIG. 10, the position of time line display area 1010 relative to the underlying time line as a whole is controlled by means of vertical scroll bar 1013 and horizontal scroll bar 1016.

Adjacent to the left of time line display area 1010 in FIG. 10 is time line control area 1020. Time line control area 1020 includes a number of controls that a user may use to control certain additional display aspects of the time line displayed in time line display area 1010. In the embodiment of FIG. 10, Time line control area 1020 includes an event selection list 1022, horizontal magnification control bar 1024 and vertical magnification control bar 1026.

Event selection list 1022 allows the user to select some or all of the events types that are to be displayed in time line display area 1010. In one or more embodiments of the invention, certain default event types are provided. In addition, event types may be defined by the user, or existing event types may be modified by the user. In one or more embodiments of the invention, the event types include the event types listed in Table 1. (Note that these are by way of example only, and the present invention is not limited to these events).

TABLE 1

Event Types

Narrative Events:

Act
Scene
Action
Dialog
Episode
Chapter
Sequence
Audio Events

Music
Sound Effect
Scratch Events

Scratch Act
Scratch Scene
Scratch Action
Scratch Dialog
Annotations

Post-It's

In the embodiment of FIG. 10, an event type to be displayed may be selected by a user by clicking on the box next to the event name in event type selection list 1022, for example by using a pointing device such as a mouse. In the embodiment of FIG. 10, an event type that has been selected for display in time line display area 1010 is indicated by a round bullet next to the event type's name in event type selection list 1022. In the example of FIG. 10, the event types that have been selected in event type selection list 1022 are Act, Scene, Dialogue and Music. Accordingly, Act, Scene, Dialogue and Music event types are displayed in time line display area 1010.

Horizontal magnification control bar 1024 and vertical magnification control bar 1026 control the horizontal and vertical scales, respectively, at which the time line is displayed in time line display area 1010. The magnification is controlled by sliding a slider along the respective magnification control bar. One end of the magnification control bar represents the maximum available magnification, while the other end of the magnification control bar represents the minimum available magnification. The position of the control bar's slider along the control bar specifies the amount of magnification used. In one or more embodiments, there is a linear relationship between the relative position of the slider and the magnification level specified. In one or more embodiments, the relationship is geometric, logarithmic, or otherwise non-linear. For example, in the embodiment of FIG. 10, the relationship is such that an incremental movement of the slider 1025 of horizontal magnification control bar 1024 produces a greater change in the magnification level when the slider is towards the right end of control bar 1024 than when the slider is towards the left end of control bar 1024.

In the embodiment of FIG. 10, the lower portion of interface 1000 comprises structural track display and control areas 1030 and 1040. Structural track display area 1030 is located beneath time line display area 1010, and structural track control area 1040 is located beneath time line control area 1020. Structural tracks are displayed in structural track display area 1030 at the same horizontal magnification used for time line display area 1010.

A structural track of one or more embodiments of the invention represents an item, resource, concept, or any other thing that the user would like to have associated with one or more events of the event time line of the invention. Each structural track extends parallel to the event time line. The user may associate any event of the time line with any structural track or tracks. The resulting associations between events and structural tracks may be selectively displayed by the user.

In one or more embodiments, the invention automatically creates certain default structural tracks for a work depending on the type of work (e.g. screenplay, novel, speech, marketing presentation, etc.) selected by the user. In one or more embodiments, the user may select structural tracks from a menu of available structural tracks, and the user may create structural tracks representing any desired tangible or intangible thing.

In the example of FIG. 10, six structural tracks are currently displayed in structural track display area 1030. Labels that identify each of the displayed structural tracks are displayed adjacent to each structural track in structural track control area 1040. Additional tracks, if any, can be displayed by using scroll bar 1055.

The structural tracks displayed in FIG. 10 include "Critical to Story" track 1060, "Background Color" track 1061, "Protagonist" track 1062, "Antagonist" track 1063, "Clues" track 1064, and "New Character" track 1065. These tracks have been created by the user to provide information desired by the user about the events for the work represented by the time line. For example, "Critical to Story" track 1060 may be used to identify events that are critical to the underlying story of the work represented by the time line, thereby indicating to the user that these events should be modified with caution and should not be deleted. On the other hand, "Background Color" track 1061 may be used to identify events that provide background color (i.e. character information, mood), which may be more freely edited and deleted. "Protagonist" track 1062 may be used to identify events in which the protagonist of the underlying story appears. "Antagonist" track 1063 may be used to identify events in which the antagonist of the underlying story appears. "Clues" track 1064 may be use to identify the events in which clues to a mystery underlying the story are presented. "New Character" track 1064 may be used to identify events in which a character appears for the first time. It should be apparent that what the user wishes a structural track to represent is unlimited.

Links (associations) between events displayed in time line display area 1010 can be created, for example, by clicking and dragging from an event's connection box [e.g. box 1076 of FIG. 10] to a desired track in structural track area 1030. Other methods of making connections include, but are not limited to, selecting the name(s) of a desired structural track from a pop-up menu, or making automatic connections based on analyzing the text content of an event.

In the embodiment of FIG. 10, links from an event to a structural track are depicted by a link line such as link line 1080 that indicates an association between Act 1 and "Critical to Story" structural track 1060. In one or more embodiments, a user may select from among a variety of methods for displaying links between events displayed in time line display area 1010 and a selected structural track.

The user may select options that cause the links to events, such as link line 1080 (connection lines) to be displayed from the structural track area 1030 to the associated events displayed in time line display area 1010. The display of these connection lines is simply an indication of the fact that a link has been made by the user, and links may exist even if connection lines are not displayed.

In one or more embodiments of the invention the user may specify that events associated with specific structural tracks are to be displayed in the time line display area, and that other events are to be hidden or dimmed. The function of Selection indicators 1075 is to cause, when selected, those events having links to the track with the selected indicator to be fully displayed, and for other events in tracks with non-selected indicators to be either hidden or dimmed.

If the optionally viewable links are shown, events associated with the highlighted structural track(s) may be highlighted in the time line display area, and highlighting of different colors may indicate associations with different structural tracks. For example, an event linked to "Critical to Story" track 1060 may be displayed with red highlighting while an event linked to "Protagonist" may be displayed with blue highlighting. Any other method or means of highlighting or otherwise indicating an association between an event and a structural track may be used.

In the embodiments of FIGS. 1–10, the time, line of the invention is shown oriented in a horizontal position. However, the time lines of FIGS. 1–10 may be oriented in any other orientation. In one or more embodiments, the user may select between a vertical, horizontal, and/or other orientations.

Figure 11:
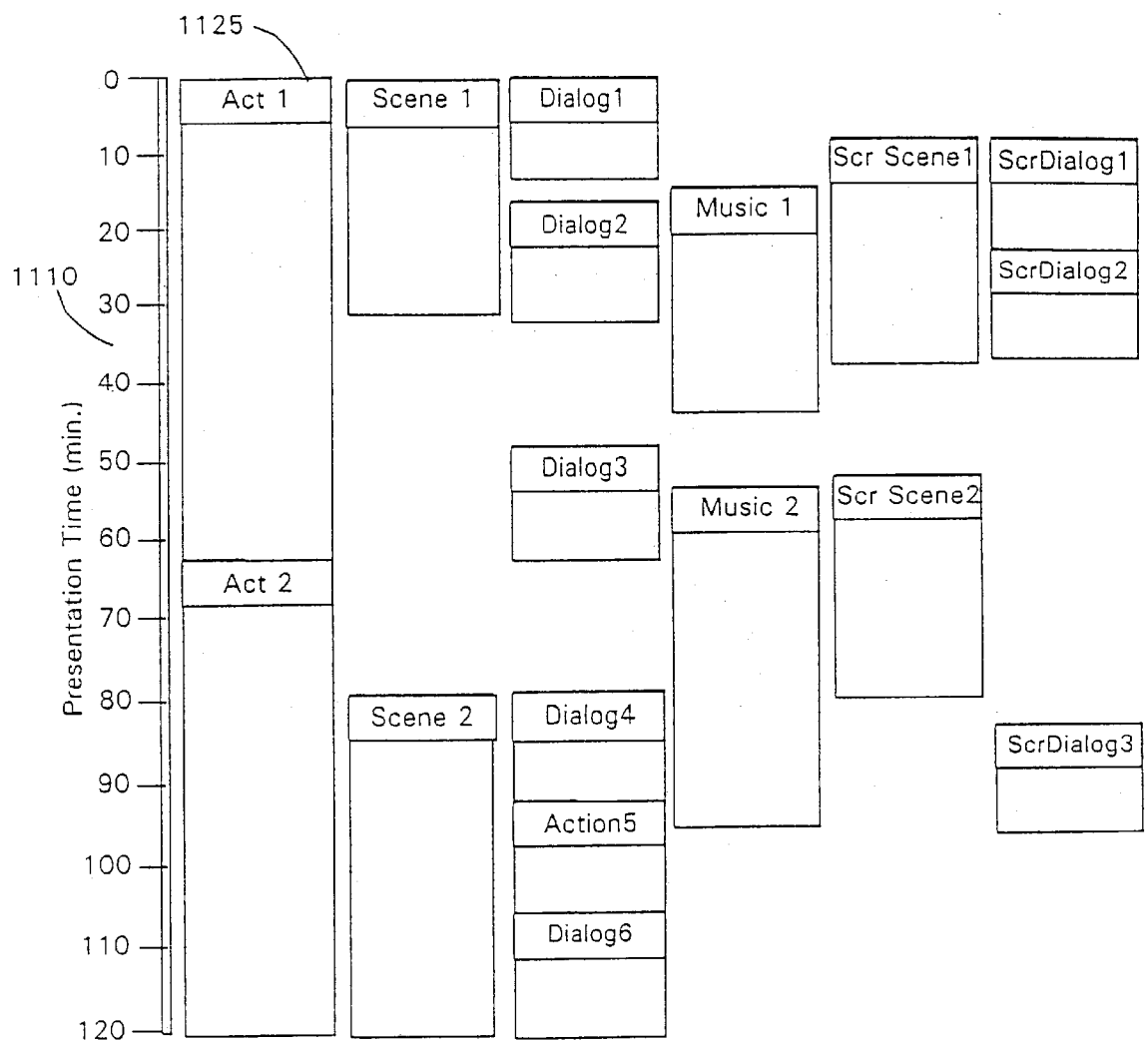
FIG. 11 shows a vertical arrangement of the time line of FIG. 1 according to one or more embodiments of the invention.

FIG. 11 shows an example embodiment in which the time line of FIG. 1 is oriented in a vertical rather than horizontal orientation. In this case, presentation metric is indicated by vertical height relative to time scale 1110 of FIG. 11. In the embodiment of FIG. 11, events are depicted as vertical bars whose vertical length represents their duration in terms of presentation metric. The representation of each event includes a horizontal title box in which the name of the event is specified, such as title box 1125 of Act 1.

Figure 12:
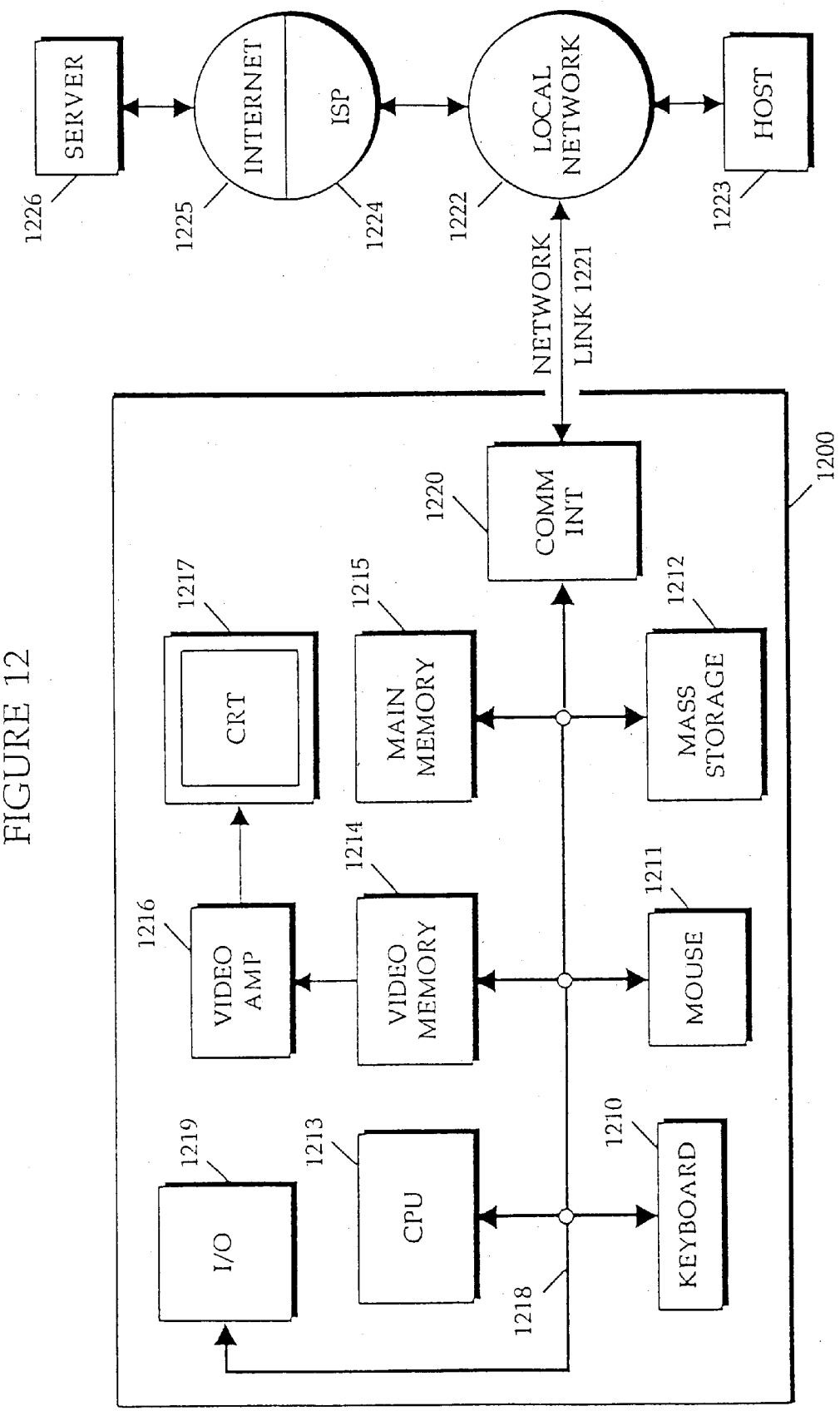
FIG. 12 shows a computer system that may be used to implement one or more embodiments of the invention.

One or more embodiments of the invention can be implemented as computer software in the form of computer readable program code executed on a general purpose computer such as computer 1200 illustrated in FIG. 12. In the system of FIG. 12, a keyboard 1210 and mouse 1211 are coupled to a bidirectional system bus 1218. The keyboard and mouse are for introducing user input to the computer system and communicating that user input to central processing unit (CPU) 1213. Other suitable input devices may be used in addition to, or in place of, the mouse 1211 and keyboard 1210. I/O (input/output) unit 1219 coupled to bidirectional system bus 1218 represents such I/O elements as a printer, A/V (audio/video) I/O, etc.

Computer 1200 includes a video memory 1214, main memory 1215 and mass storage 1212, all coupled to bi-directional system bus 1218 along with keyboard 1210, mouse 1211 and CPU 1213. The mass storage 1212 may include both fixed and removable media, such as magnetic, optical or magnetic optical storage systems or any other available mass storage technology. Bus 1218 may contain, for example, thirty-two address lines for addressing video memory 1214 or main memory 1215. The system bus 1218 also includes, for example, a 32-bit data bus for transferring data between and among the components, such as CPU 1213, main memory 1215, video memory 1214 and mass storage 1212. Alternatively, multiplex data/address lines may be used instead of separate data and address lines.

In one or more embodiments of the invention, CPU 1213 is a microprocessor manufactured by Motorola, such as the 680X0 processor or a microprocessor manufactured by Intel, such as the 80X86, or Pentium processor, or a SPARC microprocessor from Sun Microsystems. However, any other suitable microprocessor or microcomputer may be utilized. Main memory 1215 is comprised of dynamic random access memory (DRAM).

Video memory 1214 is a dual-ported video random access memory. One port of the video memory 1214 is coupled to video amplifier 1216. The video amplifier 1216 is used to drive the cathode ray tube (CRT) raster monitor 1217. Video amplifier 1216 is well known in the art and may be implemented by any suitable apparatus. This circuitry converts pixel data stored in video memory 1214 to a raster signal suitable for use by monitor 1217. Monitor 1217 is a type of monitor suitable for displaying graphic images.

Computer 1200 may also include a communication interface 1220 coupled to bus 1218. Communication interface 1220 provides a two-way data communication coupling via a network link 1221 to a local network 1222. For example, if communication interface 1220 is an integrated services digital network (ISDN) card or a modem, communication interface 1220 provides a data communication connection to the corresponding type of telephone line, which comprises part of network link 1221. If communication interface 1220 is a local area network (LAN) card, communication interface 1220 provides a data communication connection via network link 1221 to a compatible LAN. Wireless links are also possible. In any such implementation, communication interface 1220 sends and receives electrical, electromagnetic or optical signals which carry digital data streams representing various types of information.

Network link 1221 typically provides data communication through one or more networks to other data devices. For example, network link 1221 may provide a connection through local network 1222 to host computer 1223 or to data equipment operated by an Internet Service Provider (ISP) 1224. ISP 1224 in turn provides data communication services through the world wide packet data communication network now commonly referred to as the "Internet" 1225. Local network 1222 and Internet 1225 both use electrical, electromagnetic or optical signals which carry digital data streams. The signals through the various networks and the signals on network link 1221 and through communication interface 1220, which carry the digital data to and from computer 1200, are exemplary forms of carrier waves transporting the information.

Computer 1200 can send messages and receive data, including program code, through the network(s), network link 1221, and communication interface 1220. In the Internet example, server 1226 might transmit a requested code for an application program through Internet 1225, ISP 1224, local network 1222 and communication interface 1220. In accord with the invention, one such downloaded application is the method and apparatus for creating, editing and displaying works containing time-dimensioned textual components described herein.

The received code may be executed by CPU 1213 as it is received, and/or stored in mass storage 1212, or other non-volatile storage for later execution. In this manner, computer 1200 may obtain application code in the form of a carrier wave.

The computer systems described above are for purposes of example only. An embodiment of the invention may be implemented in any type of computer system or programming or processing environment.

Thus, a method and apparatus for creating, editing and displaying works containing presentation metric components is presented. Although the invention has been described with respect to certain example embodiments, it will be apparent to those skilled in the art that the present invention is not limited to these specific embodiments. For example, although the time scale along which events of the invention have been registered is shown in the example embodiments as being linear, it may also be nonlinear.

Events in a timeline may be displayed using one of the three layout modes: linear, nonlinear or ignore-durations. (Note, the following example relates to time based presentation metrics, but the present invention has equal application to non-time based presentation metrics.)

Rule 1—In linear mode, each event's display extent along the time-axis is equal to its duration in time multiplied by a scale factor, and each event's position is equal to its starting time multiplied by the same scale factor.

Rule 2—In nonlinear mode, each event's display extent is the same as in linear mode, but no less than some minimum sizes established in the view window's settings, and large enough to cover all its child-events (and the gaps between them.) The display gap between event edges is at least equal to the time difference between the edges multiplied by the scale factor. Both the event extent and display gaps may be increased from these minimums by Rule 4.

Rule 3—In ignore-durations mode, each event's display extent is sufficiently large to fully display all of its textual or graphical content, to cover all of its child-events, and no smaller than some fixed minimum. The gaps between events are of some constant size determined by user preference. Both the event extent and display gaps may be increased from these minimums by Rule 4.

Rule 4—In nonlinear or ignore-durations mode, the display extent of events or of gaps between events may be extended by the minimum amount necessary to meet the following display layout requirement: an event edge that occurs in time after another event edge must be displayed at or after the second event edge.

FIG. 13 illustrates the application of Rule 4 in accordance with one embodiment of the present invention. FIG. 14 illustrates another application of Rule 4 in accordance with one embodiment of the present invention. Here is an example of how Rule 4 could be applied:

Although the work described in the example embodiments is a screenplay, the invention can be used to create, edit and display other types of works, including books, speeches, business presentations, and any other work that a user would like to have represented by the time line of the invention. Further, although certain example graphical representations, arrangements, and interface implementations have been described, other representations, arrangements, and interface implementations may be used. Other embodiment s incorporating the inventive feature s of the invention will be apparent to those skilled in the art.

What is claimed is:

1. A method for electronically displaying a work having a first associated presentation metric, said work comprising a plurality of dynamically editable components, said method comprising the steps of:

generating said plurality of dynamically editable components;

determining a hierarchy among said dynamically editable components;

determining a second associated presentation metric for a dynamically editable component of said work;

dynamically creating a graphical representation of said dynamically editable component having a dimension related to said second associated presentation metric; and dynamically registering said graphical representation of said dynamically editable component along a time line representing said first associated presentation metric of said work wherein said step of dynamically registering comprises:

grouping said dynamically editable component with a second dynamically editable component wherein said dynamically editable component and said second dynamically editable component have a same level attribute in said hierarchy, wherein said dynamically editable component and said second dynamically editable component are one of an act, a scene or a chapter, and wherein said work is one of a script, a screenplay, play or a book.

2. The method of claim 1 wherein said first presentation metric comprises a total time of said work.

3. The method of claim 2 wherein said second presentation metric comprises a time of said component of said work.

4. The method of claim 2 wherein said second presentation metric comprises an elapsed time of said work.

5. The method of claim 2 wherein said second presentation metric comprises a reading time of said work.

6. The method of claim 2 wherein said second presentation metric comprises elapsed pages of said work.

7. The method of claim 2 wherein said second presentation metric comprises a proportion of story completed of said work.

8. The method of claim 2 wherein said second presentation metric comprises a component position.

9. The method of claim 1 wherein said first presentation metric comprises an elapsed time of said work.

10. The method of claim 1 wherein said first presentation metric comprises a reading time of said work.

11. The method of claim 1 wherein said first presentation metric comprises elapsed pages of said work.

12. The method of claim 1 wherein said first presentation metric comprises a proportion of story completed of said work.

13. The method of claim 1 wherein said first presentation metric comprises a component position.

14. The method of claim 1 wherein a change in one of said first and second presentation metric is reflected in the other of said first and second presentation metric.

15. A method of electronically displaying a work containing dynamically editable textual components comprising:

generating said dynamically editable textual components;

determining a hierarchy among said dynamically editable components;

dynamically generating and displaying a first time dimensioned graphical representation associated with a presentation time of said work;

generating and displaying a second time dimensioned graphical representation associated with a dynamically editable component of said work, where said dynamically editable component is a subset of said work and has a component presentation time; and dynamically displaying said first and second time dimensioned graphical representations such that a ratio of size of said second time dimensioned graphical representation to said first time dimensioned graphical representation is equivalent to a ratio of said component presentation time to said presentation time wherein said step of dynamically displaying said first and second time dimensioned graphical representations comprises:

grouping said second time dimensioned graphical representation with a third time dimensioned graphical representation wherein said third time dimensioned graphical representation is associated with a second dynamically editable component and wherein said dynamically editable component and said second dynamically editable component have a same level attribute in said hierarchy, wherein said dynamically editable component and said second dynamically editable component are one of an act, a scene or a chapter, and wherein said work is one of a script, a screenplay, play or a book.

16. The method of claim 15 further including automatically adjusting the size of said second time dimensioned graphical representation when said work is modified and correspondingly adjusting the size of said first time dimensioned graphical representation so that said ratio is maintained.

17. The method of claim 15 further including the step of automatically adjusting said second time dimensioned graphical representation when another graphical representation is added to said work.

18. The method of claim 15 further including navigating to said component of said work by interacting with second time dimensioned graphical representation.

\* \* \* \* \*